2,809,112
GROWTH-PROMOTING FEED SUPPLEMENTS AND METHODS OF PRODUCING THEM

George Wilson Anderson and Stanley James Slinger, Guelph, Ontario, Canada

No Drawing. Application August 3, 1953, Serial No. 372,193

Claims priority, application Canada August 9, 1952

2 Claims. (Cl. 99—4)

This invention relates to growth promoting feed supplements and methods of producing them.

In accordance with one aspect of this invention growth promoting feed supplements are produced by incorporating in a carrier a culture of a growth promoting microorganism, for example a culture of a growth promoting bacteria such as a culture of E. coli and a culture of atypical E. coli. Such feed supplements when administered to animals such as fowl results in a marked growth promoting effect.

In accordance with another aspect of this invention, feed supplements of especially high growth promoting activity are produced by combining a culture of a growth promoting microorganism and a non-nutrient, non-bacterial growth promoting substance. Such supplements effect a significantly higher growth promoting activity than the growth promoting effects of either component. Preferably such supplements also include a carrier for relatively easy addition to the feed.

The non-nutrient, non-bacterial growth promoting substance which forms one of the components in accordance with the second aspect of this invention, is preferably an antibiotic such as penicillin, terramycin, aureomycin, or bacitracin, although it may be any other non-nutrient, non-bacterial growth promoting substance such as arsenical compounds, for example, arsenilic acid, sodium arsenilate, 3 nitro 4 hydroxyphenylarsonic acid; or surface active agents, such as lauryl alcohol and ethylene oxide condensates. Conveniently the antibiotic may be a derivative of the antibiotic itself, such as a derivative of penicillin, for example procaine penicillin.

The carrier employed in the feed supplements of this invention may be soy bean meal, corn meal or other ground cereal, charcoal, fuller's earth, oyster shells, and the like. Alternatively, the carrier may be a liquid such as physiological saline solution or a nutrient medium. The concentration of the active growth promoting components of the feed supplements is desirably such that 5 lbs. or less of such supplements are effective in treating one ton of feed stuff.

A more comprehensive understanding of this invention is obtained by reference to the following examples:

The microorganisms fed in the typical examples were isolated from the caecal contents of chicks and grown as pure cultures on suitable media of well known character. Twenty-four hour old cultures were mixed with the feed daily at a level of 10% of the diet. The number of viable cells fed each day was estimated by the dilution and plate count method. The M. P. N. method was used for tube cultures. An attempt was made to maintain the following number of cells per inoculum daily—atypical E. coli strain[1] $5 \times 10^9$; atypical E. coli strain[2] $5 \times 10^9$; E. coli $5 \times 10^8$.

Example 1

In this experiment, four pens of 20 chickens were fed on the following basal diet:

| Ingredient | | per 100 pounds |
|---|---|---|
| Ground yellow corn | lbs | 60.75 |
| Soybeans oil meal (44%) | lbs | 33.0 |
| Dehydrated cereal grass | lbs | 2.0 |
| Limestone | lbs | 0.5 |
| Steamed bone meal | lbs | 3.25 |
| Iodized salt | lbs | 0.25 |
| Fish oil (300 I.C.U.D., 1500A) | lbs | 0.25 |
| Riboflavin | mg | 150 |
| Niacin | mg | 900 |
| Ca pantothenate | mg | 300 |
| Vitamin $B_{12}$ | mg | 0.2 |
| Choline chloride (25%) | gm | 70 |
| Potassium iodide (90%) | mg | 150 |
| Manganese sulfate (tech) | gm | 10 |

In addition, the chickens in each pen received either a nutrient medium or the same medium inoculated with atypical E. coli which was added the the basal diet. Procaine penicillin G was added to the diet of the chickens in two of the pens in an amount of 10 parts per million parts of diet.

Fifteen chickens in each pen (five per day at 2 day interval) were sacrificed from each group, at the end of a 5 week experimental period. Bacteriological analyses and pH determinations were carried out on the caecal contents of these birds.

The results of this testing were as follows:

| Pen No. | Treatment | Results at 5 wks. | |
|---|---|---|---|
| | | wt. (gm.) | Feed/Gain |
| 1 | Basal+Nutrient Broth (N. B.) | 508 | 2.10 |
| 2 | Basal+N. B.+Atypical E. coli [1] | 509 | 2.14 |
| 3 | Basal+N. B.+Procaine Penicillin G | 520 | 2.16 |
| 4 | Basal+N. B.+Atypical E. coli [1]+Procaine Penicillin G. | 616 | 2.12 |

This strain produced a green metallic sheen, did not ferment sucrose or dulcitol and did not give the standard Imvic's reaction. It will be noted that neither the atypical E. coli[1] nor penicillin alone produced a significant growth response. However, the atypical E. coli[1] in the presence of penicillin caused a highly significant increase in weight. This suggests interaction between the organism and the antibiotic.

Example 2

An experiment similar to that described in Example 1 was conducted simultaneously. The procedure followed in this example was the same, except that atypical E. coli[2] was employed instead of atypical E. coli[1]. The results of this experiment with atypical E. coli[2] are shown in the following table:

| Pen No. | Treatment | Results at 5 wks. | |
|---|---|---|---|
| | | wt. (gm.) | Feed/Gain |
| 1 | Basal+N. B. | 508 | 2.10 |
| 5 | Basal+N. B.+Atypical E. coli [2] | 555 | 2.14 |
| 3 | Basal+N. B.+Procaine Penicillin G | 520 | 2.16 |
| 6 | Basal+N. B.+Atypical E. coli [2]+Procaine Penicillin G. | 571 | 2.12 |

This strain was found to produce an abnormal green-metallic sheen, fermented sucrose slowly, produced no gas with rhamnose and gave the standard Imvic's reaction. This strain when fed alone caused growth significantly better than the control diet. The feeding of this strain along with penicillin resulted in a weight highly significantly greater than the basal diet and significantly better than that of the group receiving only penicillin.

Example 3

In this example, typical *E. coli* was used. The procedure followed herein was identical with that of Example 1. The results obtained with *E. coli* are shown in the following table:

| Pen No. | Treatment | Results at 5 wks. | |
|---|---|---|---|
| | | wt. (gm.) | Feed/Gain |
| 1 | Basal+N. B. | 508 | 2.10 |
| 7 | Basal+N. B.+*E. coli* | 528 | 2.27 |
| 3 | Basal+N. B.+Procaine Penicillin G | 520 | 2.16 |
| 8 | Basal+N. B.+*E. coli*+Procaine Penicillin G. | 586 | 2.13 |

Example 4

In this experiment 10% of a mixed culture of the 2 atypical strains of *E. coli* and *E. coli* were used. In addition, other groups received 10% of the filtrate or the cells equivalent to 10% of the culture.

The effect of a mixed coliform culture and the filtrate on growth is shown in the following table:

| Pen No. | Treatment | Results at 5 wks. | |
|---|---|---|---|
| | | wt. (gm.) | Feed/Gain |
| 1 | Basal+N. B. | 438 | 2.35 |
| 2 | Basal+N. B.+Procaine Penicillin G | 484 | 2.20 |
| 3 | Basal+N. B.+Coliforms | 475 | 2.30 |
| 4 | Basal+N. B.+Procaine Penicillin G+Coliforms. | 487 | 2.20 |
| 5 | Basal+filtrate | 424 | 2.19 |
| 6 | Basal+filtrate+Penicillin | 500 | 2.24 |

Penicillin, coliforms and a combination of the culture plus antibiotic caused some increase in growth and some improvement in feed efficiency. In no case was the growth increase significant at the 5% point. The filtrate alone caused no increase in growth while the filtrate plus penicillin caused a weight significantly greater than the basal diet. These data suggest interaction between a factor or factors in the filtrate and the antibiotic.

Example 5

In the experiment there is shown the effect of feeding the cells of the mixed coliform culture on the growth of chicks. The results of this experiment are shown in the following table:

| Pen No. | Treatment | Results at 5 wks. | |
|---|---|---|---|
| | | wt. (gm.) | Feed/Gain |
| 7 | Basal | 460 | 2.53 |
| 8 | Basal+Penicillin | 483 | 2.34 |
| 9 | Basal+Coliform Cells | 474 | 2.35 |
| 10 | Basal+Penicillin+Cells | 462 | 2.33 |

In this case neither the penicillin, the cells or a mixture resulted in a significant growth response. However, when feed efficiency is also considered it would appear that all treatments tended to give a favorable response. As a result of this experiment it would appear that the activity of bacterial cultures may be attributed in part to a factor or factors in the filtrate and in part to the cells themselves.

Example 6

In a further experiment Broad Breasted Bronze poults of mixed sexes were fed certain of these same cultures.

The basal diet used in this work was a practical turkey starting diet adequate in known nutrients and was as follows:

| Ingredient | | per 100 pounds |
|---|---|---|
| Ground wheat | lbs | 21.5 |
| Ground corn | lbs | 15.0 |
| Ground oat groats | lbs | 5.0 |
| Cereal grass | lbs | 2.0 |
| Fish meal (65%) | lbs | 2.0 |
| Meat meal (50%) | lbs | 2.0 |
| Dried buttermilk | lbs | 2.0 |
| Soy bean (44%) | lbs | 45.0 |
| Ground limestone | lbs | 2.5 |
| Steamed bone meal | lbs | 2.0 |
| Iodized salt | lbs | .5 |
| Fish oil (300-1500) | lbs | .5 |
| Riboflavin | mg | 150 |
| Niacin | mg | 750 |
| Vitamin B₁₂ supplement | g | 22.7 |
| Manganese sulfate (tech) | g | 5.7 |
| Total | lbs | 100 |

The following table shows the effect of feeding a mixed coliform culture and a culture of *E. coli*:

| Pen No. | Treatment | Results at 4 weeks of age | | | |
|---|---|---|---|---|---|
| | | Wt. (gm.) | Wt. (gm.) | Wt. (gm.) | Feed/Gain |
| 3 | Basal+N. B. | 516 | 420 | 468 | 1.83 |
| 4 | Basal+N. B.+Penicillin | 717 | 597 | 657 | 1.68 |
| 5 | Basal+N. B.+Mixed Col. | 472 | 436 | 454 | 1.98 |
| 6 | Basal+N. B.+Mixed Col.+Penicillin. | 751 | 628 | 690 | 1.72 |
| 13 | Basal+N. B.+*E. coli* | 559 | 532 | 545 | 1.85 |
| 14 | Basal+N. B.+*E. coli*+Penicillin. | 697 | 642 | 670 | 1.67 |

The weight date for males and females were analyzed separately using the "T" test. All diets containing penicillin gave weights significantly better than the basal diet. The feeding of *E. coli* alone caused an increase in weight which was highly significant in the females. The diet containing the mixed culture plus penicillin gave superior growth to that containing penicillin alone; again indicating an interaction between the bacterial culture and the antibiotic.

Example 7

This experiment shows the effect of feeding mixed coliform cells on growth of poults.

| Pen No. | Treatment | Results at 4 weeks of age | | | |
|---|---|---|---|---|---|
| | | Wt. (gm.) | Wt. (gm.) | Wt. (gm.) | Feed/Gain |
| 1 | Basal | 524 | 458 | 491 | 1.92 |
| 2 | Basal+Penicillin | 696 | 593 | 645 | 1.71 |
| 9 | Basal+living cells | 445 | 476 | 461 | 1.95 |
| 10 | Basal+living cells+Penicillin. | 745 | 595 | 669 | 1.67 |
| 11 | Basal+dead cells | 493 | 478 | 485 | 1.91 |
| 12 | Basal+dead cells+Penicillin. | 666 | 605 | 636 | 1.69 |

All diets containing penicillin gave weights significantly better than the basal diet. The living cells alone caused a significant growth depression in the males, but in the presence of penicillin resulted in growth in males superior to that obtained with penicillin alone. This suggests interaction between the living cells and the antibiotic. No interaction is apparent between the dead cells and the antibiotic. The filtrate in this experiment did not cause growth response.

What is claimed is:

1. A growth promoting supplement for a nutritionally adequate poultry feed comprising a dry, solid carrier, an antibiotic selected from the group consisting of penicillin and procaine penicillin, and an effective amount of a culture of a viable growth-promoting microorganism selected from the group consisting of *Escherichia coli*, an atypical of *Escherichia coli*, and mixtures thereof.

2. The method of producing a growth promoting supplement for a nutritionally adequate poultry feed which comprises incorporating in a dry, solid carrier an antibiotic selected from the group consisting of penicillin and procaine penicillin, and an effective amount of a culture of a viable growth-promoting microorganism selected from the group consisting of *Escherichia coli*, an atypical of *Escherichia coli*, and mixtures thereof.

References Cited in the file of this patent

UNITED STATES PATENTS

| | | |
|---|---|---|
| 2,447,814 | Novak | Aug. 24, 1948 |
| 2,482,055 | Duggar | Sept. 13, 1949 |
| 2,636,823 | Becze | Apr. 28, 1953 |

OTHER REFERENCES

Romoser et al.: Proc. Soc. Exp. Biol. and Med., May 1953, 83, pages 17–21.